Oct. 1, 1968  E. R. VEECH  3,403,863
VINE SPREADING APPARATUS
Filed May 27, 1966  2 Sheets-Sheet 1
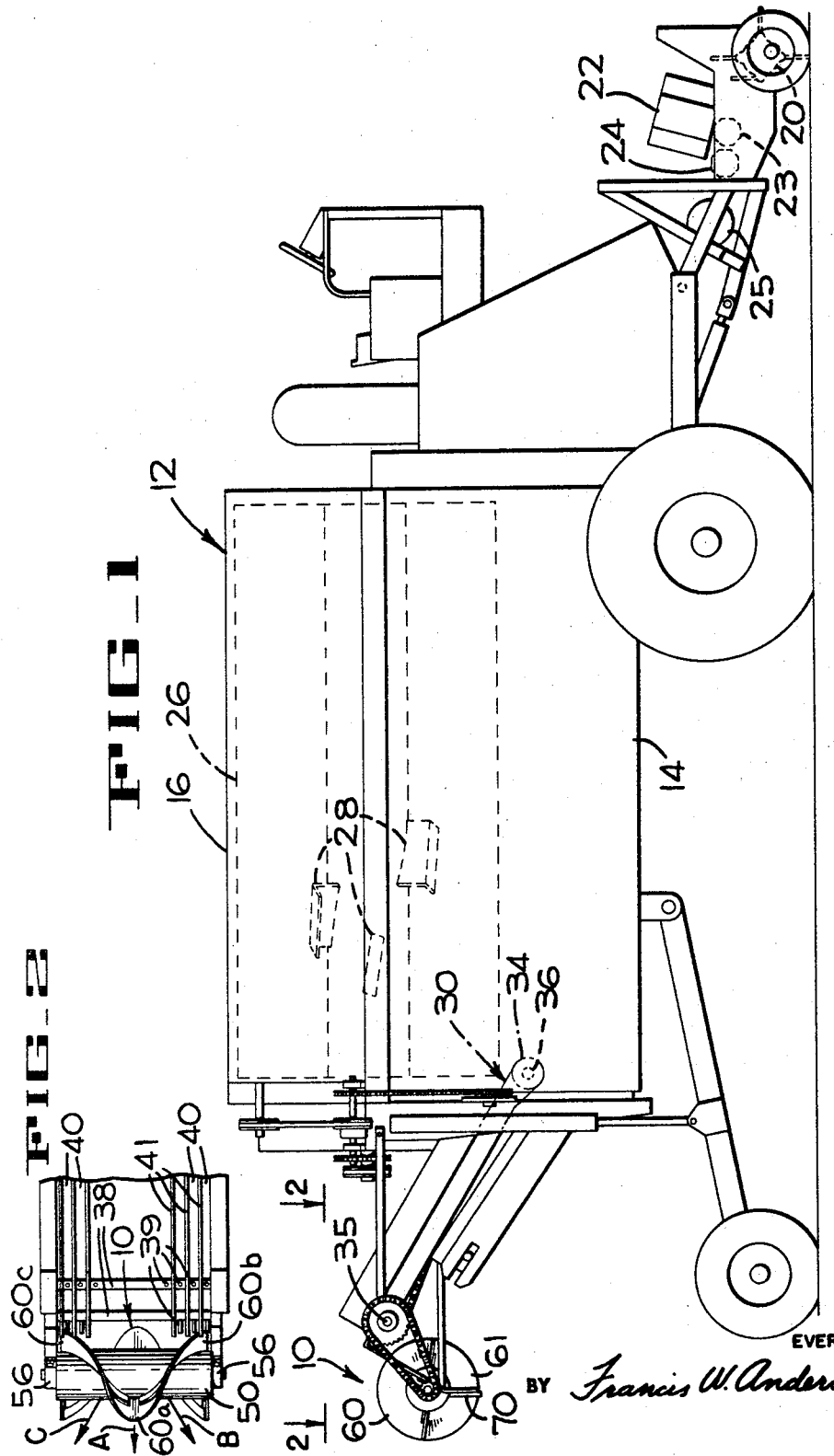
INVENTOR
EVERETT R. VEECH
BY Francis W. Anderson
ATTORNEY Oct. 1, 1968   E. R. VEECH   3,403,863
VINE SPREADING APPARATUS
Filed May 27, 1966   2 Sheets-Sheet 2
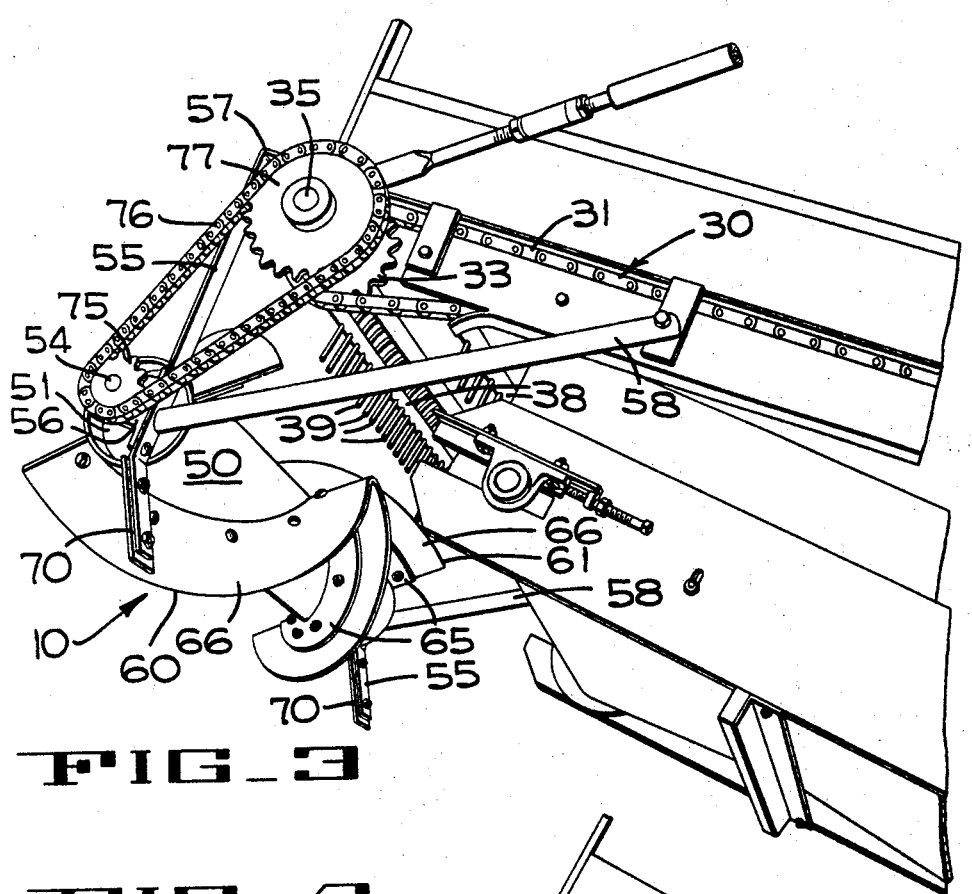
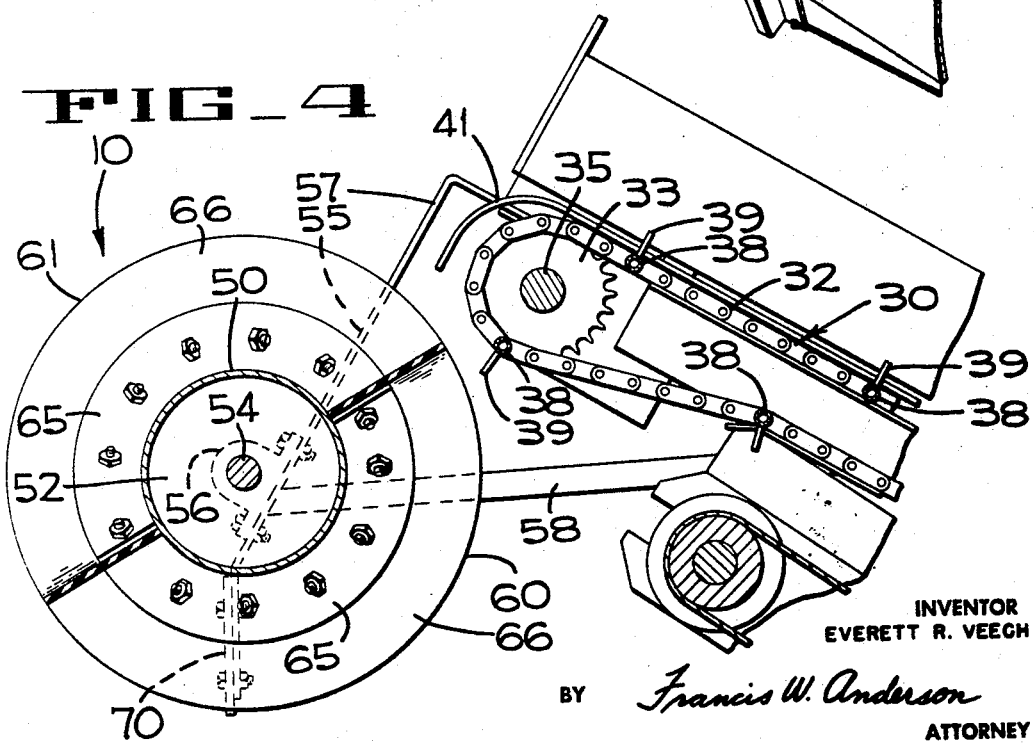
INVENTOR
EVERETT R. VEECH
BY *Francis W. Anderson*
ATTORNEY United States Patent Office 3,403,863
Patented Oct. 1, 1968

3,403,863
VINE SPREADING APPARATUS
Everett R. Veech, Hoopeston, Ill., assignor to FMC Corporation, San Jose, Calif., a corporation of Delaware
Filed May 27, 1966, Ser. No. 553,447
6 Claims. (Cl. 239—272)

ABSTRACT OF THE DISCLOSURE

A spreader for the vines from which the crop has been stripped in a harvester is formed of a drum mounting of two radially opposed vanes, the vanes comprising oppositely inclined helical blades joined at the midplane of the drum and formed of a yieldable material such as rubber belting.

This invention relates to harvesting equipment, and more particularly concerns a mechanism for receiving vines from a harvester and spreading them onto the ground behind the harvester.

In harvesting vine crops, the vines with the crop, such as peas, thereon are pulled or severed from the ground and deposited in a threshing drum or cylinder where they are tumbled and contacted by beaters and the like to remove the crop from the vines. After the vines have been stripped, they are discharged onto the field behind the forwardly moving harvester.

It has been found that, if the vines are spread out to form a layer of vines on the field, the vines are efficiently worked into the soil and have a fertilizing effect. On the other hand, if the stripped vines are deposited in piles on the ground, the vines cannot be effectively worked into the soil and, as a result, the soil must be provided with other fertilizer.

Accordingly it is an object of the present invention to provide an efficient vine-spreading mechanism that is capable of receiving vines in a randomly-arranged mass from the discharge mechanism of a harvester spreading the vines in a layer-like pattern.

Another object is to provide a spreading mechanism particularly adapted for handling vine crops.

Other and further features, objects and advantages of the present invention will be apparent from the following description taken in connection with the accompanying drawings, in which:

FIGURE 1 is a diagrammatic side elevation of the pea harvester of the present invention.

FIGURE 2 is a diagrammatic fragmentary plan view looking in the direction of arrows 2—2 of FIGURE 1.

FIGURE 3 is a diagrammatic perspective of the vine spreading mechanism of the present invention.

FIGURE 4 is a diagrammatic central section of the vine spreading mechanism.

The embodiment of the vine spreading mechanism of the present invention that is illustrated in FIGURES 1–4 is indicated generally by the reference numeral 10 and is shown mounted on the discharge end of a pea harvester 12. The harvester 12 may be of the type disclosed in pending patent application of Slates et al., Ser. No. 538,689 which is assigned to the assignee of the present application and may comprise a wheel-supported chassis 14 on which a large open-ended housing 16 is mounted. At the forward end of the harvester is mounted a vine-pickup mechanism that includes a pickup reel 20 which is arranged to lift the vines from the ground and feed them rearwardly between a pair of vertical, side-by-side octagonal rollers 22 (one only being shown) and over rollers 23, 24 and 25 which, in turn, direct the vines onto an elevator (not shown). The vines are elevated and fed into the open front end of the housing 16 and then into the open forward end of a perforated, open-ended drum 26 that is rotatably mounted in the housing 16 on rollers that engage the periphery of the drum. A plurality of beaters 28 are rotatably mounted in the reel and are effective to separate the peas from the vines. The beaters are paddle-like members that not only have a threshing action but, due to the fact that they have a pitch, are arranged to advance the vines toward the open rear end of the drum. As the vines are pushed out of the drum, they drop onto the upper run of an upwardly inclined endless conveyor 30 whose lower end underlies the rear end of the drum.

The conveyor 30 comprises a pair of link chains 31 and 32 (FIGS. 3 and 4) that are trained around drive sprockets 33 and idler sprockets 34 (FIG. 1) carried by shafts 35 and 36 respectively which are mounted for rotation in a support structure 37 of the harvester. The chains 31 and 32 have a plurality of transverse rods 38 connected therebetween at regularly spaced intervals. Each rod 38 is provided with a plurality of upstanding rigid tines or fingers 39 that project normal to the rod and are adapted to project upwardly through slots 40 (FIG. 2) defined by spaced rigid bars 41 which provide an upwardly inclined surface along which the vines are pushed by the tines 39 in the upper run of the conveyor. It will be noted in FIGURE 4 that the upper ends of the bars 41 are curved and are so disposed relative to the drive sprockets 33 around which the chains 31 and 32 are trained, that the tines 39 are, in effect, retracted and drawn inwardly of the bars 41, causing the vines to be stripped from the tines and directed downwardly onto the vine-spreading mechanism 10 of the present invention.

The vine-spreading mechanism includes a drum 50 that has end plates 51 and 52. A shaft 54, that extends through and is welded to the end plates, is disposed on the axis of the drum and is rotatably journalled near each end in a bearing 56 that is mounted on a fixed bracket 55 made up of rigid arms 57 and 58. As vines drop onto the drum they are moved laterally in opposite direction by two radially opposed identical vanes 60 and 61 that project upwardly from the cylindrical surface of the drum. Each spreader vane comprises a rigid, metal spiral (helical) support member 65 to which a spiral blade 66 of yieldable material is secured by machine screws. Each spiral blade 66 may be made of a yieldable material such as rubber belt stock or canvas that is heavy enough to maintain its spiral form. As seen in FIGURE 2 each spreader blade is so arranged on the drum that it defines a central, generally U-shaped portion 60a at the midplane of the drum, and two oppositely inclined helical portions 60b and 60c. As the drum rotates counterclockwise (FIGURE 1) the vines that fall in front of the U-shaped central portion 60a of either spreader-blade is hurled forwardly substantially in the direction of arrow A (FIG. 2). Vines falling in front of inclined portions 60b and 60c will be hurled substantially in the direction of arrows B and C respectively. Thus, the vines will be distributed laterally in opposite directions, as well as directly rearwardly.

A generally vertical stripper bar 70 is secured in depending relation on bracket 55, each bar having a vertical side edge disposed adjacent the path of movement of the vanes 60 to engage vines projecting from the drum.

The shaft 54 of the spreader drum carries a sprocket 75 (FIG. 3) at one end, and a chain 76 connects the sprocket 75 to a sprocket 77 that is secured to the conveyor shaft 35. The drum 26 and the beaters 28 may be driven in any conventional manner, as by the drive mechanism disclosed in the patent application of Burenga Ser. No. 458,633, now Patent No. 3,351,200, issued Nov. 7, 1967 which is assigned to the assignee of the present application. The conveyor shaft 35 may be driven independently or by a mechanism connected to the drive mechanism that actuates the beaters. It has been found that if the drum 50 is approximately six inches in diameter and the vanes are about four inches high, effective vine spreading can be accomplished if the drum is rotated at the rate of 282 r.p.m.

From the foregoing description it will be apparent that the present invention provides a vine spreader that effectively distributes vines. Further, the fact that the vanes are made of yieldable material assures that operators will not be seriously injured if they accidentally come in contact with the vanes.

Having thus described the invention, what I claim as new and desire to protect by Letters Patent is:

1. In a harvester of the type wherein the produce is separated from vines and the stripped vines spread on the ground; a conveyor for moving the stripped vines rearwardly of the harvester, a vine spreader below the discharge end of said vine conveyor, said spreader comprising a rotating drum, two radially opposed spreader vanes on said drum, each of said vanes comprising oppositely inclined helical blades with smooth peripheral edges, said blades being joined at the midplane of the drum for directing the vines away from the drum midplane, and means for rotating said drum.

2. The harvester of claim 1, wherein said blades are formed of a yieldable material.

3. The harvester of claim 2, wherein a scraper bar is fixed at each end of said drum for cooperating with the ends of said yieldable blades to deflect protruding vines.

4. The harvester of claim 2, wherein said helical blades wrap around said drum through an angle of about 180°.

5. The harvester of claim 2, wherein said drum is approximately six inches in diameter and said vanes project about four inches from the drum.

6. The harvester of claim 5, wherein said drum is rotated at approximately 282 r.p.m.

References Cited

UNITED STATES PATENTS

| 292,550 | 1/1884 | Fairly | 198—213 |
|---|---|---|---|
| 1,445,265 | 2/1923 | Bohmker | 239—681 |
| 2,602,670 | 7/1952 | Burkart | 239—687 |
| 2,677,550 | 5/1954 | Berger | 239—655 |
| 3,014,729 | 12/1961 | Henningsen | 239—681 |
| 3,084,942 | 4/1963 | Kucera | 239—658 |

RICHARD E. AEGERTER, *Primary Examiner.*